United States Patent [19]

Jones

[11] 4,071,368

[45] Jan. 31, 1978

[54] MOLD RELEASE COMPOSITION

[75] Inventor: John R. Jones, Los Angeles, Calif.

[73] Assignee: Lubeco, Inc., Compton, Calif.

[21] Appl. No.: 704,338

[22] Filed: July 12, 1976

[51] Int. Cl.$^2$ .......................... B28B 7/36; C03B 39/00
[52] U.S. Cl. ..................... 106/38.28; 65/24;
    65/26; 106/38.22; 106/38.27; 106/85; 106/286;
    252/30; 264/338; 427/135
[58] Field of Search ............. 106/14, 38.22, 38.27,
    106/38.28, 85, 280, 286; 252/28, 29, 30; 65/24,
    26; 264/338; 427/135

[56] References Cited

U.S. PATENT DOCUMENTS

| | | | |
|---|---|---|---|
| 2,784,108 | 3/1957 | Cupper | 106/38.22 |
| 3,248,250 | 4/1966 | Collins | 106/286 |
| 3,248,251 | 4/1966 | Allen | 106/286 |
| 3,915,870 | 10/1975 | Brown | 106/38.28 |
| 3,928,673 | 12/1975 | Pardee et al. | 65/24 |
| 3,994,847 | 11/1976 | Marcantonio et al. | 65/24 |

*Primary Examiner*—Lorenzo B. Hayes
*Assistant Examiner*—Willie J. Thompson
*Attorney, Agent, or Firm*—Max Geldin

[57] ABSTRACT

A composition particularly effective as a high temperature lubricant for molds used in glass-forming operations and effective at high temperatures of the order of about 1,000° F, comprising a mixture of graphite and a high melting inorganic oxide or salt, preferably potassium titanate, and an inorganic binder e.g. a slurry of magnesium oxide in a mixture of phosphoric acid and chromic acid. The mold lubricant composition also preferably contains a wetting agent, e.g. butyl Cellosolve (ethylene glycol monobutyl ether).

20 Claims, No Drawings

MOLD RELEASE COMPOSITION

BACKGROUND OF THE INVENTION

This invention relates to novel mold release and lubricant compositions, and is particularly concerned with mold release compositions for protecting and lubricating the surfaces of molds, especially molds employed in the forming and handling of glass articles, e.g. containers, at high temperatures.

In glass manufacturing, particularly the glass bottle or container industry, a paticularly difficult problem has always been the release of the extremely hot glass, at a temperature of up to 1,200° F and higher, from the blank or mold in the first forming operation. Flowing from the furnace, the molten red-hot glass is immediately cut into "gobs", which slide down chutes and drop into the mold, where a bottle is blown as soon as the various mechanisms of the apparatus close around the gob. The blown glass is immediately seized and turned upside down into a second mold, where it is blow again, to its final shape. The entire operation takes only a few seconds.

The mold release composition of the present invention is designed primarily for use with the first mold or blank. The hot glass is extremely abrasive and tends to abrade and tear up the sides of the mold on which the glass container is initially formed. Without suitable lubication of this machined, usually cast iron mold surface, the hot glass could not be removed from the mold and the contours of the mold surface would become rough and constantly changing, making uniform production impossible.

It is accordingly a requirement that the molding surface of the blank mold not become abraded or pitted so that the molten glass will readily flow over the molding surface, take the shape thereof, and then readily separate therefrom. Since the glass is generally heated in the glass-forming equipment to temperatures which can range from 1,000° F to as high as 1,200° F or more, any mold release compositions must be compatible and effective at these high temperatures, without decomposition.

The conventional method for providing glass mold lubrication in the industry has been to "swab" the inside of the mold or blank with a mixture or dispersion of graphite in a light lubricating oil (petroleum distillate), such as kerosene. Since the mold or blank attains an operating temperature of the order of 1,000° F, the oil immediately burns off, producing obnoxious odors and enormous clouds of smoke, and leaving behind a deposit of graphite plus a carbonaceous residue which provide a solid film of lubricant. The problem of smoke formation cannot be alleviated by cooling the mold or blank, because this would chill the glass below the temperature required for blowing the glass to the desired shape. Further, there is a tendency for hard carbon deposits to build up on the mold surfaces thus producing inferior glassware.

In addition, such conventional mold release compositions must be applied to the mold at frequent intervals, requiring additional labor and expense, and with potential increased danger of injury to operators handling the high temperature molds.

As a result, various solutions to these problems have been proposed.

Thus, for example, in U.S. Pat. No. 3,052,629 there is disclosed a glass mold lubricant comprised of a mineral oil base concentrate containing two particular types of dissimilar nonionic surface active agents, a non-abrasive lubricant solid and a water-soluble corrosion inhibitor. The solid lubricant which is added to the oil base in relatively minor amounts can include various carbon blacks, colloidal graphite, mica, and mixtures of such materials with borax and metal oxides such as lead or titanium oxide.

U.S. Pat. No. 3,915,870 discloses a mold release composition containing tungsten disulfide, admixed with graphite or carbon, sodium silicate and a setting agent such as zinc oxide, calcium chloride, magnesium sulfate, and the like.

However, to applicant's knowledge, none of the prior art mold release compositions have been found completely satisfactory.

It is an object of the present invention to provide an improved mold release composition, particularly effective for use as a mold release agent in glass forming operations at high temperatures. Another object is to provide an improved mold release composition of the above type which provides a pre-formed long lasting film on the critical surfaces of the mold or blank, such film having low friction characteristics and having high adherence or tenacity with respect to the mold surface without sticking to the glass, and which is oxidation resistant at high glass forming temperatures up to approximately 1,200° F, and is tough and durable sufficient to survive the rigorous glass forming operations for an extended period, especially up to 18 hours or more, without replenishing.

DESCRIPTION OF THE INVENTION

The above objects are achieved according to the invention by the provision of a mold release composition comprising a mixture of certain oxidation-resistant solid lubricants and an inorganic binder, together with suitable solvents and wetting agents to facilitate proper homogeneity, good spraying characteristics and suitable adhesion to the mold surface.

It has been found upon investigation that the solid lubricants which produce the most effective results are mixtures of graphite and certain high-melting inorganic compounds, particularly oxides or salts. Either natural or synthetic forms of graphite can be employed, the particle size of which may range from between about 0.1 to about 100 microns. The preferred form of graphite is the finely divided form of graphite having a particle size ranging from about 0.5 to 10 microns.

Suitable exemplary high melting oxides or salts which are employed in admixture with the graphite include titanium dioxide ($TiO_2$), antimony trioxide ($Sb_2O_3$), calcium fluoride ($CaF_2$), barium fluoride ($BaF_2$), mica and potassium titanate ($K_2TiO_3$). Preferred solid lubricant mixtures are a combination of graphite and potassium titanate, or a combination of graphite and antimony trioxide. Potassium titanate has been found most desirable in combination with graphite, since potassium titanate has a much higher resistance to oxidation than antimony trioxide. The preferred form of potassium titanate is the fibrous form, as exemplified by the material marketed as Fibex P by the Dupont Company.

It has been found that the use of graphite alone as lubricant oxidizes too rapidly even with a protective binder of conventional type. On the other hand, the above noted oxides and salts alone do not provide adequate lubricity or release properties because they tend to adhere to the glass. However, the combination of graphite and one or more of the above noted oxides or salts as lubricant solids according to the invention functions in a synergistic manner preventing rapid oxidation of the graphite at the high temperatures of the glass forming equipment, while at the same time affording good lubricity or release properties without adhering to the glass.

The binder employed in combination with the above-noted mixture of solid lubricants can be any of a variety of polymer-forming, inorganic substances. However, it has been found that the most suitable materials for purposes of the invention are (1) phosphoric acid, (2) combinations or mixtures of phosphoric acid and chromic acid, (3) combinations or mixtures of phosphates, particularly alkaline earth metal phosphates, phosphoric acid and chromic acid and (4) sodium and potassium silicates.

Particularly effective binders for purposes of the invention have been found to be combinations of phosphates, especially the alkaline earth phosphates, phosphoric acid and chromic acid. Such binders are prepared by forming a slurry of the appropriate metal oxide, e.g. alkaline earth metal oxide, or hydroxide, and adding to such slurry phosphoric acid and then chromic acid. Suitable metal oxides or hydroxides which can be employed for this purpose are any of those which forms a high melting phosphate when reacted with phosphoric acid, examples of which include magnesium oxide, zinc oxide, strontium oxide, barium oxide and calcium hydroxide. These materials can be employed separately or in admixture.

The amount of metal oxide or hydroxide used in producing the binder can range from 0 to the stoichiometric amount required to react with all the phosphoric acid, but amounts in the very low portion of the above range do not produce as tough a binder and amounts in the upper portion of the above range present solubility problems.

The above noted metal oxides or hydroxides are employed preferably in relatively small amount in relation to the phosphoric acid, so that the amount of such oxide or hydroxide used is presently in substantially less than stoichiometric proportions with respect to the phosphoric acid. The preferred range is from about 2 to 6 parts of oxide or hydroxide to 60 parts of phosphoric acid ($H_3PO_4$) by weight. Thus, when the phosphoric acid is added to the slurry of the metal oxide or hydroxide, a reaction between the metal oxide or hydroxide and the phosphoric acid takes place, forming the corresponding phosphate or phosphates, e.g. magnesium phosphate, zinc phosphate, strontium phosphate, barium phosphate or calcium phosphate, or mixtures thereof where mixtures of the metal oxides and/or hydroxides are used. Since as noted above a stoichiometric excess of phosphoric acid with respect to the metal oxide or hydroxide preferably is present, the resulting binder will contain phosphates and also such excess phosphoric acid.

The preferred metal oxide for admixture with the phosphoric acid, is magnesium oxide. In a typical procedure for producing a preferred binder according to the invention, water is added to the metal oxide, e.g. magnesium oxide, to form a slurry, and concentrated phosphoric acid containing a stoichiometric excess of phosphoric acid with respect to the magnesium oxide, is added to the slurry, and considerable heat is generated as result of the reaction between the magnesium oxide and phosphoric acid. An aqueous solution of chromic acid ($Cr_2O_3$) is added to the solution of phosphoric acid and phosphate, e.g. magnesium phosphate, forming a solution of the magnesium phosphate, excess phosphoric acid and chromic acid. The chromic acid can be employed in an amount ranging from about 15 to about 35 parts, preferably above 20 to about 30 parts, per 60 parts total phosphoric acid.

The following are specific examples of binders employed in producing the mold lubricant composition of the invention, all parts being expressed in terms of parts by weight, unless otherwise indicated.

EXAMPLE 1

To 4 parts MgO (magnesia) are added 100 parts of distilled water to produce a slurry. To such slurry there are slowly added 70 parts phosphoric acid (85%), considerable heat being generated by the resulting reaction, and the slurry clears up. A solution of 24 parts chromic acid ($Cr_2O_3$) in 100 parts distilled water is added to the above magnesia/phosphoric acid solution, and the resulting solution is thoroughly mixed until it becomes clear. Tap water can be employed instead of distilled water in preparing the above slurry of magnesium oxide and in forming the chromic acid solution. The above binder solution contains 26.4 weight percent of binder solids, and is a preferred binder.

All of the following variations of the above binder solution are prepared in substantially the same manner as in Example 1 above, except that the quantities of components and the respective components vary as noted in the examples below.

EXAMPLE 2

Same procedure as in Example 1, except that zinc oxide is employed instead of magnesia, and in the same amount. In this example, less heat of solution is formed when phosphoric acid is added to the zinc oxide than in the case of magnesia in Example 1.

EXAMPLE 3

The procedure of Example 1 is followed except that 7.4 parts of $Ca(OH)_2$ are employed instead of the 4 parts of magnesia. The resulting binder solution contains 26.4 weight % binder solids.

EXAMPLE 4

The procedure of Example 1 is followed using the following components:

| | | | |
|---|---|---|---|
| 3.6 | parts | MgO | ⎫ |
| 0.8 | parts | ZnO | ⎬ Slurry |
| 100 | parts | distilled water | ⎭ |
| 70 | parts | $H_3PO_4$ (85%) | ⎫ |
| 24 | parts | $Cr_2O_3$ | ⎬ chromic acid |
| 100 | parts | distilled water | ⎭ solution |

The resulting binder solution contains 26.5 weight % binder solids.

EXAMPLE 5

The procedure of Example 1 is followed using the following components:

| | | |
|---|---|---|
| 15 | parts | $Ca(OH)_2$ |
| 300 | " | distilled water |
| 30 | " | $H_3PO_4$ |
| 30 | " | $Cr_2O_3$ |

In this example it is noted that a higher ratio of metal oxide, that is calcium hydroxide, with respect to phosphoric acid is employed. The resulting binder solution contains 13.6 weight % binder solids.

EXAMPLE 6

The procedure of Example 1 is followed employing the following components and amounts thereof:

| | | | |
|---|---|---|---|
| 2 | parts | MgO | |
| 2 | parts | Ca(OH)$_2$ | Slurry |
| 2 | parts | ZnO | |
| 100 | parts | distilled water | |
| 70 | parts | H$_3$PO$_4$ (85%) | |
| 24 | parts | Cr$_2$O$_3$ | Chromic acid solution |
| 100 | parts | distilled water | |

The resulting binder solution contains 26.6 weight % binder solids.

EXAMPLE 7

The procedure of Example 1 is followed employing the following components and amounts thereof:

| | | | |
|---|---|---|---|
| 15 | parts | MgO | |
| 1 | part | Ca(OH)$_2$ | Slurry |
| 1 | part | ZnO | |
| 400 | parts | distilled water | |
| 280 | parts | H$_3$PO$_4$ (85%) | |
| 96 | parts | Cr$_2$O$_3$ | Chromic acid solution |
| 400 | parts | distilled water | |

Although the preferred binder is the binder of Example 1, any of the binders of Examples 2 to 7 can be used, separately or in admixture.

When one of the above described binders is added to the mixture of the above solid lubricants, namely, the graphite and high melting salt or oxide, e.g. potassium titanate, the resulting composition is in the nature of a two-phase system comprised of the binder and lubricant solids, that is, a mixture of graphite and the high melting oxide or salt, e.g. potassium titanate, forming a dispersion of the mold release composition in water. When applied to a mold utilized in a glass forming operation, such composition forms a high temperature bonded solid lubricant coating or film thereon. A satisfactory range of total lubricant solids to binder ranges from about 30 to above 70, preferably about 40 to about 60, parts of lubricant solids per 100 parts binder, by weight. In general, increasing the amount of binder increases the hardness of the lubricant or mold release coating, at the sacrifice of lubricity and surface smoothness. Increasing the amount of graphite tends to soften the coating.

The diluent or solvent employed in the mold release compositions of the invention, and particularly in the binder employed therein, as noted above, is water. However, various wetting agents or detergents can also be incorporated into the mold release compositions hereof. The wetting agents facilitate dispersion of water-insoluble components present in the mold release composition, such as the graphite and high-melting oxide or salt, e.g. potassium titanate, and to stabilize the resulting dispersion. Various conventional surfactants or wetting agents can be employed for this purpose, the preferred wetting agents being polyhydric alcohols such as the cellosolves, which are mono- and dialkyl ethers of ethylene glycol and their derivatives, wherein the alkyl groups contain from about 2 to about 8 carbon atoms, e.g. ethylene glycol monoethyl ether (Cellosolve), ethylene glycol monobutyl ether (butyl Cellosolve), and the like. Various other surfactants can be used, such as triethanolamine, alkyl benzene sulfonates, e.g. the sodium salt of $C_{12}$ linear alkyl benzene sulfonates, and the like.

The proportions of the components present in the overall mold release composition of the invention described above, are noted in Table 1 below.

TABLE 1

| Components | General Range Parts by wt. | Preferred Range Parts by wt. |
|---|---|---|
| Graphite | About 6 to about 62 | About 13 to about 44 |
| High melting oxide or salt, e.g. K$_2$TiO$_3$ | About 3 to about 56 | About 9 to about 39 |
| Binder | 100 | 100 |
| Wetting Agent | About 30 to about 400 | About 60 to about 125 |

Where potassium titanate or antimony trioxide is employed as high melting oxide or salt, the general and preferred proportions of the components are as follows:

TABLE 2

| | Ranges, Parts by Weight | | | |
|---|---|---|---|---|
| | General | | Preferred | |
| Components | | | | |
| Graphite | 6–30 | 15–62 | 13–24 | 30–44 |
| K$_2$TiO$_3$ | 17–56 | — | 26–39 | — |
| Sb$_2$O$_3$ | — | 3–35 | — | 9–18 |
| Binder | 100 | 100 | 100 | 100 |
| Wetting Agent | 34–345 | 27–388 | 62–126 | 62–126 |

For mixtures of graphite and potassium titanate, there is preferably employed about 5 to about 15 parts, most desirably about 8 to 12 parts of graphite to 20 parts of potassium titanate by weight, a 2 to 1 ratio of potassium titanate to graphite being optimum. For mixtures of graphite and antimony trioxide, there is preferably employed about 5 to about 40 parts, most desirably about 10 to about 20 parts antimony trioxide to 40 parts of graphite, by weight.

In employing the mold release composition of the invention, it is generally desirable to clean the surface of the glass-forming equipment and mold first, to remove all contamination such as loose particles, oil, dirt, metal oxides, and the like, to assure greater adhesion and longer life of the coating.

An aqueous dispersion of the mold release composition is applied to the mold surface and the water allowed to evaporate. The dispersion or mixture of the mold release composition of the invention can be applied to the mold surface by any conventional means such as brushing, spraying, dipping or blowing onto the surface, spraying being the preferred procedure. After the coating composition is applied to the mold surface, the coated composition is permitted to air dry until the water is substantially removed. Thereafter, the coating can be subjected to a higher temperature to remove any residual water. Any such residual water can be removed when the mold is initially heated for glass-forming operations. In preferred practice the applied coatings are heated at temperature ranging from about 300° to about 500°, preferably about 350° to 400° F, for a period of 30 minutes to about 2 hours to assure complete removal of water and to set the binder. Upon removal of the water and setting of the binder a uniform and smooth thin coating of the mold release composition is formed on the metal mold surface. Such coating adheres strongly to the mold and is not removed over an extended period of glass forming operations at high temperatures of the order of 1,000° to 1,200° F, and higher. The thickness of the lubricant or mold release coating can vary, and can range from between about 0.0002 and about 0.005 inch. Coatings of a thickness approaching and in excess of about 0.002 inch and coatings less than about 0.0001 inch thick are of decreased effectiveness. Coating thicknesses of about 0.0005 to about 0.001 inch have been found most desirable. The coating is thermally stable, has high oxidation resistance and permits adequate heat transfer to the glass in the mold. The coating of mold release agent has good lubricity at the above noted high temperatures and does not stick to the glass.

The mold release compositions of the invention have a number of advantages. These include (1) the elimination of the toxic fumes of voluminous smoke clouds resulting from rapid oxidation of the oil employed in conventional mold release compositions, (2) increase in the wear life of the individual molds or blanks, (3) production of a better surface finish on the glass, (4) increase in the volume of production by minimizing the number of glass rejects, and (5) decreasing the amount of labor required by eliminating the repeated replenishment for swabbing operations carried out at frequent intervals when employing the conventional mold release compositions. Thus, the mold release coatings applied to the mold employing the mold release compositions of the invention result in substantial savings in time and cost, since a single application or coating of the mold release compositions hereof on a mold permits the glass-forming and handling equipment to remain operative over substantially longer periods than heretofore.

Although the mold release compositions of the present invention have been designed primarily for use in glass-forming machines and equipment, it will be understood that such compositions are similarly useful for application to other molds, requiring parting and lubrication. Thus, the compositions of the invention can be used in the metal forming industry, e.g. in production of aluminum, and also on molds for forming plastics, rubber articles and elastomers.

The following are examples of the preparation and use of mold release compositions according to the invention, all parts being expressed in terms of parts by weight unless otherwise indicated.

EXAMPLE 8

A coating composition according to the invention was prepared by mixing together 40 parts graphite (Dixon 200-39) and 10 parts antimony trioxide. To the resulting mixture of lubricants was added 100 parts BC-10 (10% butyl cellosolve and 90% distilled water, by volume), and the resulting slurry was mixed to thoroughly wet the solids. 200 parts of the binder of Example 1 was then added and the resulting composition was mixed thoroughly to form a uniform free-flowing dispersion.

The above mixture was sprayed on the surface of clean molds of glass-forming equipment, such surface having been previously lightly sand-blasted. The spray coating was then permitted to air dry to remove water, and was then oven-baked at 350°–400° F for 1 hour, to remove all remaining water and to set the binder, providing a final coating of a thickness of between 0.0005 and 0.001 inch.

The resulting coating on the mold surface survived and remained effective and intact for 18 hours of glass-forming operation, to produce glass bottles, with no swabbing, that is treatment with the conventional oil and graphite composition, and with no replenishment by additional application of the above mold release composition.

The blank mold operated efficiently over such 18 hour period of operation to produce bottles of uniform wall thickness and high quality, and during this period of operation, substantially no toxic odors or smoke clouds were observed. Although the coated surface of the mold after the test appeared sooty, it was otherwise in excellent condition.

EXAMPLE 9

The procedure of Example 8 is substantially followed except employing a mold release composition having the following components in the amounts set forth below:

| Components | PARTS BY WEIGHT |
| --- | --- |
| Potassium titanate (Du Pont Fibex P) | 20 |
| Graphite | 10 |
| Butyl cellosolve (BC-10) | 100 |
| Binder (Example 1) | 200 |

The above composition when applied to the surface of a mold provides an effective durable mold parting or mold release coating similar to and having the advantages of the coating produced in Example 8.

EXAMPLE 10

A mold release composition was prepared according to the procedure of Example 8, but employing the following components and proportions thereof noted below.

| COMPONENTS | PARTS BY WEIGHT |
| --- | --- |
| Graphite | 10 |
| Potassium titanate | 40 |
| BC-10 | 170 |
| Binder of Example 6 | 500 |

Such composition was applied by spraying to the surface of a stainless steel coupon, and dried by air drying, to form a coating of a thickness of about 0.001 inch, followed by heating of the stainless steel coupon to 1,400° F for 20 minutes and 1,600° F for 20 minutes.

The appearance of the coating was slightly discolored, and there was some blistering at the edges after the 1600° F exposure, but the coating generally appeared good.

EXAMPLE 11

The following mold release composition was prepared according to the procedure of Example 8, the binders of Examples 1 and 6 being premixed in the proportions noted below, before admixture with the other components.

|                    | Parts by Weight |
|--------------------|-----------------|
| Graphite           | 10              |
| Potassium Titanate | 20              |
| BC-10              | 100             |
| Binder of Example 1| 200             |
| Binder of Example 6| 25              |

Glass blanks or molds coated with the above composition substantially as discussed in Example 8, forming coatings of a thickness of about 0.0005 to about 0.001 inch, produced good glass objects in a factory operation for 48 continuous hours.

Application of coatings from the above composition having a thickness of between 0.002 inch and 0.004 inch to glass molds in a similar factory glass forming operation resulted in decreased life of the coatings.

EXAMPLES 12 and 13

The following mold release compositions were prepared substantially according to the procedure of Example 8.

|                    | Parts by Weight ||
|                    | Example 12 | Example 13 |
|--------------------|------------|------------|
| Graphite           | 5          | 15         |
| Potassium Titanate | 20         | 20         |
| BC-10              | 100        | 100        |
| Binder of Example 1| 200        | 200        |
| Binder of Example 6| 25         | 25         |

The results obtained with coatings of Examples 12 and 13 above were not as good as with the coating of Example 11, but were effective coatings.

EXAMPLE 14

The following mold release composition was prepared according to the procedure of Example 8.

|                    | Parts by Weight |
|--------------------|-----------------|
| Graphite           | 10              |
| Potassium Titanate | 20              |
| BC-10              | 100             |
| Binder of Example 1| 225             |
| Binder of Example 6| 35              |

Effective results were obtained with mold release coatings produced from the above composition, such coatings containing an increased amount of binder being substantially harder than the coatings of Example 11.

Of the coatings produced according to the examples above, those coatings produced from the compositions of Examples 8 and 11, particularly the latter, performed best.

From the foregoing, it is seen that the invention achieves the above noted objects in providing an improved mold relase composition particularly useful in glass forming operations at high temperatures, forming a coating which is durable over extended periods without requiring replenishment, and which is highly adherent to the mold surface but which does not adhere to the glass, and which is oxidation resistant, particularly at high glass forming temperatures.

While I have described particular embodiments of my invention for purposes of illustration, it is understood that other modifications and variations will occur to those skilled in the art, and the invention accordingly is not to be taken as limited except by the scope of the appended claims.

What is claimed is:

1. A mold release and lubricating composition comprising an oxidation resistant solid lubricant formed of a mixture of graphite and potassium titanate; and an inorganic binder, in proportions of about 6 to about 62 parts of graphite, and about 3 to about 56 parts of potassium titanate, to 100 parts of inorganic binder, by weight.

2. A composition as defined in claim 1, wherein said inorganic binder is selected from the group consisting of (1) phosphoric acid, (2) mixtures of phosphoric acid and chromic acid, (3) mixtures of phosphates, phosphoric acid and chromic acid, and (4) sodium and potassium silicates.

3. A composition as defined in claim 2, said inorganic binder being a mixture of alkaline earth metal phosphates, phosphoric acid and chromic acid.

4. A composition as defined in claim 2, wherein said inorganic binder is a mixture of a phosphate selected from the group consisting of magnesium, zinc, strontium, barium and calcium phosphates; phosphoric acid and chromic acid.

5. A composition as defined in claim 4, said phosphate being magnesium phosphate formed by adding magnesium oxide to phosphoric acid in an amount less than stoichiometric with respect to phosphoric acid.

6. A composition as defined in claim 1, including a wetting agent.

7. A composition as defined in claim 6, wherein said wetting agent is a polyhydric alcohol.

8. A composition as defined in claim 6, said wetting agent being a mono- or dialkyl ether of ethylene glycol, wherein the alkyl groups contain from about 2 to about 8 carbon atoms.

9. A composition as defined in claim 1, said graphite having a particle size ranging from about 0.1 to about 100 microns.

10. A composition as defined in claim 1, the amount of said lubricant to binder ranging from about 30 to about 70 parts per 100 parts binder, by weight.

11. A composition as defined in claim 4, the amount of said lubricant to binder ranging from about 30 to about 70 parts lubricant per 100 parts binder, by weight.

12. A mold release and lubricating composition comprising an aqueous dispersion of a mixture of about 6 to about 62 parts of graphite, and about 3 to about 56 parts of potassium titanate, to 100 parts of an inorganic binder, and about 30 to about 400 parts of a wetting agent, by weight.

13. A composition as defined in claim 12, containing about 13 to about 44 parts of graphite, and about 9 to about 39 parts of said potassium titanate to 100 parts of said binder, and about 60 to about 125 parts of said wetting agent, by weight.

14. A composition as defined in claim 12, wherein said inorganic binder is a mixture of a phosphate selected from the group consisting of magnesium, zinc, strontium, barium and calcium phosphates, phosphoric acid and chromic acid.

15. A composition as defined in claim 14, said phosphate being magnesium phosphate formed by adding magnesium oxide to phosphoric acid in an amount less than stoichiometric with respect to phosphoric acid.

16. A composition as defined in claim 14, said wetting agent being a mono- or dialkyl ether of ethylene glycol.

17. A composition as defined in claim 14, and containing about 6 to about 30 parts of graphite, about 17 to about 56 parts of potassium titanate, 100 parts of binder, and about 35 to about 345 parts of said wetting agent, by weight.

18. A composition as defined in claim 14, and containing about 13 to about 24 parts of graphite, about 26 to about 39 parts of potassium titanate, about 100 parts of binder and about 62 to about 126 parts of said wetting agent, by weight.

19. A composition as defined in claim 18, containing about a 2 to 1 ratio of potassium titanate to graphite, by weight, and wherein said wetting agent is a mono- or dialkyl ether of ethylene glycol, wherein the alkyl groups contain from about 2 to about 8 carbon atoms.

20. A composition as defined in claim 15, containing about 2 to 6 parts of magnesium oxide to 60 parts of phosphoric acid ($H_3PO_4$), by weight, and about 15 to about 35 parts chromic acid, per 60 parts phosphoric acid by weight.

* * * * *